United States Patent [19]

Estreicher et al.

[11] Patent Number: 4,727,973

[45] Date of Patent: Mar. 1, 1988

[54] SPINDLE PRESS WITH REPLACEABLE CLUTCH PADS

[75] Inventors: Marian Estreicher, Essen; Dietrich Ronge, Grefrath; Klaus Hilgers, Krefeld, all of Fed. Rep. of Germany

[73] Assignee: G. Siempelkamp GmbH & Co., Krefeld, Fed. Rep. of Germany

[21] Appl. No.: 826,134

[22] Filed: Feb. 4, 1986

[30] Foreign Application Priority Data

Feb. 6, 1985 [DE] Fed. Rep. of Germany ....... 3503917

[51] Int. Cl.[4] ............ F16D 13/00

[52] U.S. Cl. ............ 192/70.13; 192/110 S

[58] Field of Search ............ 192/70.13, 109 R, 110 B, 192/110 R, 110 S

[56] References Cited

U.S. PATENT DOCUMENTS

| | | | |
|---|---|---|---|
| 1,913,802 | 6/1933 | Gregory | 192/107 R |
| 2,079,389 | 5/1937 | Wemp | 192/112 |
| 2,741,353 | 4/1956 | Ward | 192/85 AA |
| 2,913,081 | 11/1959 | Rudisch | 192/18 B |
| 3,749,213 | 7/1973 | Maucher | 192/48.8 |
| 4,132,294 | 1/1979 | Poli | 188/218 XL |
| 4,236,614 | 4/1982 | Matagrano | 192/70.13 |
| 4,540,079 | 9/1985 | Link | 192/109 R |

FOREIGN PATENT DOCUMENTS

| | | | |
|---|---|---|---|
| 2922165 | 12/1980 | Fed. Rep. of Germany | 192/70.13 |
| 3222064 | 10/1984 | Fed. Rep. of Germany . | |

*Primary Examiner*—John E. Murtagh
*Assistant Examiner*—Andrew Joseph Rudy
*Attorney, Agent, or Firm*—Karl F. Ross; Herbert Dubno; Andrew Wilford

[57] ABSTRACT

A press has a flywheel and a spindle both rotatable about an axis, an axially displaceable ram and nut threadedly engaging the spindle so that rotation of the spindle axially displaces the ram, and a clutch between the flywheel and the spindle. The clutch has a housing formed with a radially open service port, a clutch plate rotationally fixed to the flywheel, and another clutch plate rotationally fixed to the spindle. One of the plates is formed with axially open cavities and one of the plates is axially movable through a relatively long stroke between an outer position with the plates spaced apart and an inner position with the plates close together. High-friction coupling elements of a predetermined axial height shorter by a working distance than the long plate stroke are seated in the cavities. The movable clutch plate can be displaced through the long axial stroke so that the clutch plates engage axially and rotationally link the spindle and flywheel. A stop operatively engageable with the clutch can limit displacement of the movable plate to the working distance. The service port is oriented such that in the outer position of the movable plate the coupling elements can be displaced axially out of their cavities and removed radially from the clutch housing through the service port.

7 Claims, 6 Drawing Figures

SPINDLE PRESS WITH REPLACEABLE CLUTCH PADS

FIELD OF THE INVENTION

Our present invention relates to a spindle press and, more particularly, to an improved spindle press in which the coupling elements or clutch pads of the friction coupling or clutch are more easily replaced.

BACKGROUND OF THE INVENTION

A spindle press can comprise a continuously unidirectionally driven flywheel, a threaded spindle, a spindle nut, a ram member, a frictional coupling or clutch between the flywheel and the spindle, and a controlling and operating mechanism for the frictional coupling connected to a source of pressurized medium for operation thereof.

The friction coupling under a coupling cover can have a first coupling plate rotating with the driven plate, an opposing second coupling plate connected to the spindle, and a plurality of coupling elements or shoes of a high friction material.

The controlling and operating mechanism can be equipped with a releasing mechanism and with at least one coupling cylinder piston mechanism coupled to the controlling and operating mechanism which has a predetermined actuating distance for operating the clutch.

Spindle presses of this kind have been successful, especially where a controlling mass is provided, which by its inertia upon a pressing operation opens a valve for a pressurized medium of the frictional coupling, and causes the release of the frictional coupling. The coupling elements are elements which are subject to considerable wear and must be replaced from time to time.

In a spindle press of this type, see for example German Pat. No. 33 22 064, the regulating distance of the coupling cylinder piston mechanism is the working distance of the frictional coupling. It is traversed in every activation of the coupling, and changes according to the wear on the coupling elements. Thus only replaceable coupling elements can be used. For the purpose of replacing the coupling elements, the entire head of the spindle press and the frictional coupling usually must be removed.

OBJECTS OF THE INVENTION

It is an object of our invention to provide an improved spindle press obviating the drawbacks of earlier systems.

It is also an object of our invention to provide an improved spindle press having a frictional coupling with coupling elements which are, when worn, replaceable more easily than those of the prior art.

It is another object of our invention to provide an improved spindle press having a frictional coupling mechanism with coupling elements which are replaceable without removal of the entire head and frictional coupling of the spindle press.

SUMMARY OF THE INVENTION

These objects and others which will become more apparent hereinafter are attained in accordance with our invention in a spindle press comprising a unidirectionally continuously driven flywheel, a spindle, a friction coupling or clutch between the flywheel and the spindle, and a controlling and operating mechanism for the friction coupling connected to a source of pressurized medium for operation thereof.

The friction coupling under a coupling cover has a first coupling plate rotating with the flywheel, an opposing second coupling plate connected to the spindle, and a plurality of coupling elements of or coated with a material with a high coefficient of friction.

The controlling and operating mechanism is equipped with a releasing mechanism and with at least one coupling cylinder piston mechanism coupled to the controlling and operating mechanism which has a predetermined clutch actuating distance or stroke.

According to our invention the stroke of the coupling cylinder piston mechanism is made up of a working distance and mounting distance. The mounting distance is large by contrast to the working distance and at least partly defines a mounting space in the frictional coupling which allows replacement of the coupling elements, and the mounting free space is associated with at least one service port in the coupling cover. The controlling and operating mechanism can have a mechanical and/or hydraulic regulating distance-limiting mechanism or stop by means of which the regulating distance is limitable to the working distance, and which can be taken out of operation or disabled in order to change the high-friction coupling elements.

In spindle presses according to our invention the coupling elements can thus be replaced in an easy, simple way.

It is only necessary to put the clutch operating distance limiting mechanism out of operation so that the mounting free space according to the now allowable mounting distance can be made available. This mounting space is accessible through the service port in the clutch housing or cover so that the coupling elements can be replaced. This replacement is carried out by first retracting the movable clutch plate fully, then pulling the coupling elements axially out of the respective cavities and then radially out of the clutch through the service port. Then new coupling elements are fitted radially in through the service ports, are dropped axially into the empty cavities to complete the job.

In a spindle press according to our invention, the working distance can be adjusted according to the wear on the coupling elements, so that the spindle press always works with a very small working distance.

In this preferred embodiment of our invention the ratio of the mounting distance to the working distance is adjustable for the purpose of compensating for wear on the coupling elements, and the mounting distance is at least ten times the working distance. The coupling cover has two closable service ports lying opposite each other in the sides of the clutch cover or housing.

In the spindle press according to our invention the mechanical and/or hydraulic regulating distance limiting mechanism can have various forms. In one preferred embodiment, which is characterized by simplicity and reliability, the regulating distance limiting mechanism is purely mechanical and comprises a plurality of sliding heads or plungers which are mounted adjustably and removably in the coupling cover and against which the first coupling plate pushes in its reverse displacement.

In contrast an easy and functional hydraulic regulating distance limiting mechanism comprises at least one limiting cylinder piston mechanism having an adjustable limit distance, the mechanism being connected to the clutch. The pressurized-fluid inlet pipe for the coupling cylinder piston mechanism has a non-return valve which can be bypassed.

The coupling elements or shoes can be so arranged and constructed as is common in this kind of spindle press. In a preferred embodiment of our invention the friction clutch has loose coupling elements which are mounted replacably in the coupling element cavities of the first coupling plate and/or the opposing second coupling plate.

BRIEF DESCRIPTION OF THE DRAWING

The above and other objects, features and advantages of our invention will become more readily apparent from the following description, reference being made to the accompanying highly diagrammatic drawing, in which.

SPECIFIC DESCRIPTION

Figure 1:
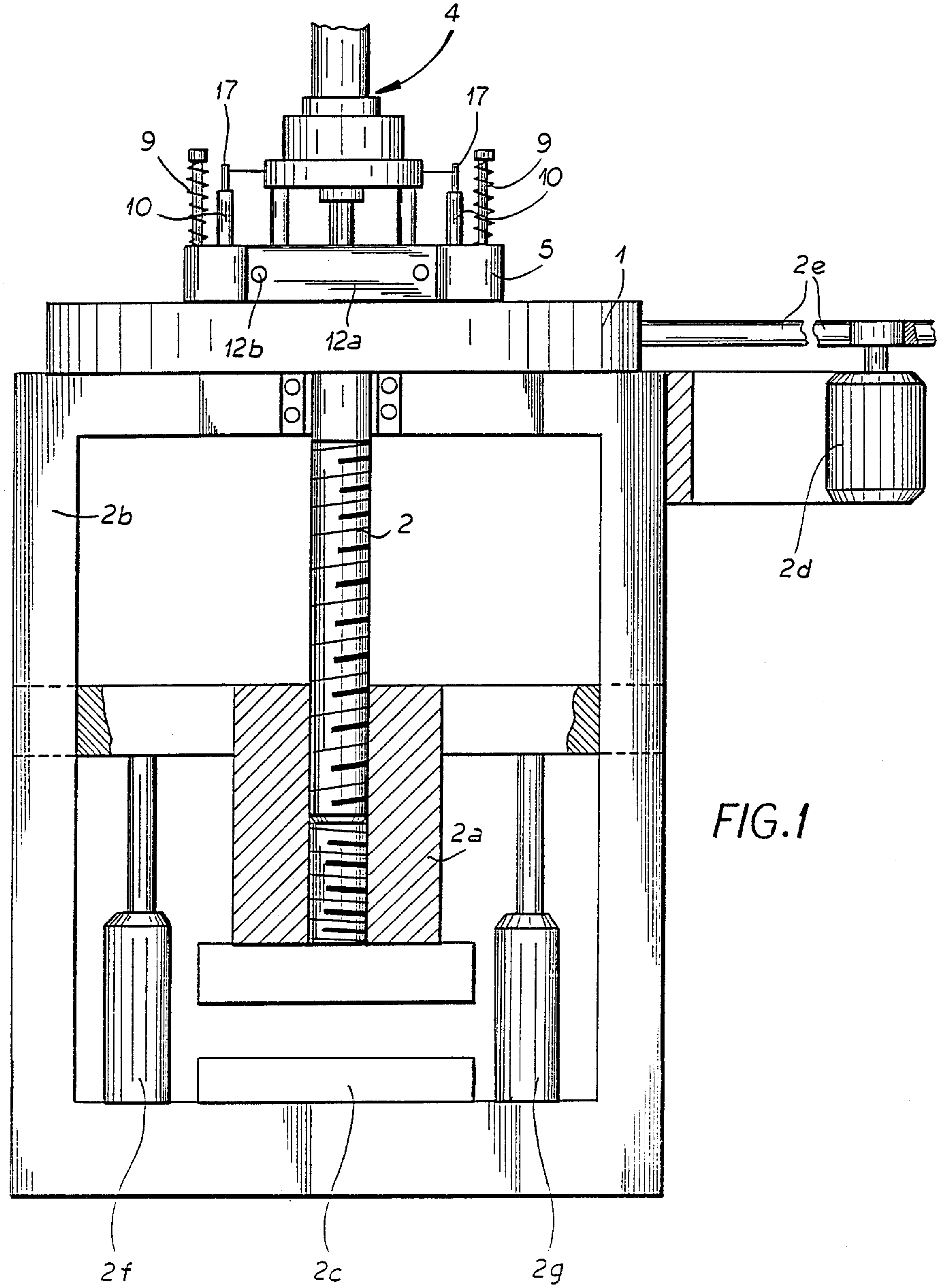
FIG. 1 is a highly diagrammatic elevational view of a press embodying the invention without the inertial control mechanism and with only the parts essential to an overview of the invention being shown.
Figure 1B:
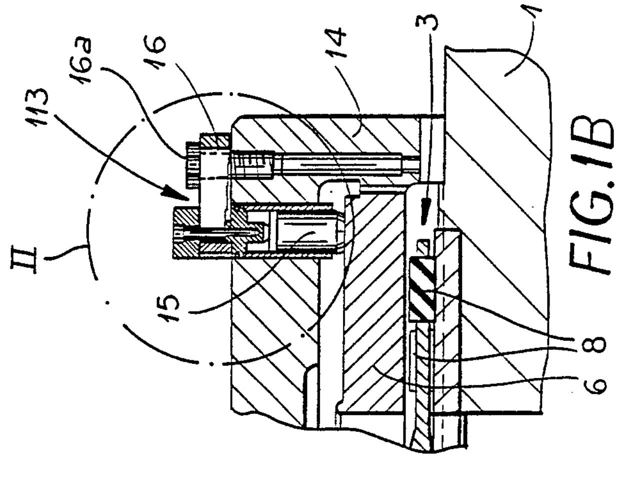
FIGS. 1A and 1B are axial cross-sectional views through heads of spindle presses according to our invention showing, respectively, a hydraulic and a mechanical distance limiting device.

The spindle press shown in cross section in the drawing has a flywheel 1 rotating continuously in the same direction, a spindle 2, a spindle nut 2*a* journaled in frame 2*b*, a ram member 2*c*, a friction clutch 3 between flywheel 1 and spindle 2, and a controlling and operating mechanism 4 for the friction clutch 3, which is connected to a source of a pressurized medium.

A wheel 1 2*d* drives the motor via a belt 2*e* and, with the clutch released, the ram and nut are raised by cylinders 2*f* and 2*g*. The control mechanism can be of the type described previously and any conventional means can be used to feed the pressurized fluid to the rotating parts.

The friction clutch 3 has under a coupling cover 5 a first coupling plate 6 rotating with the flywheel 1, an opposing second coupling plate 7 attached to spindle 2, and coupling elements 8 of a high-friction material.

The controlling and operating mechanism 4 is equipped with a retraction mechanism, for example, in the form of a releasing spring 9 and at least one coupling cylinder piston mechanism 10 associated with it.

Figure 1A:
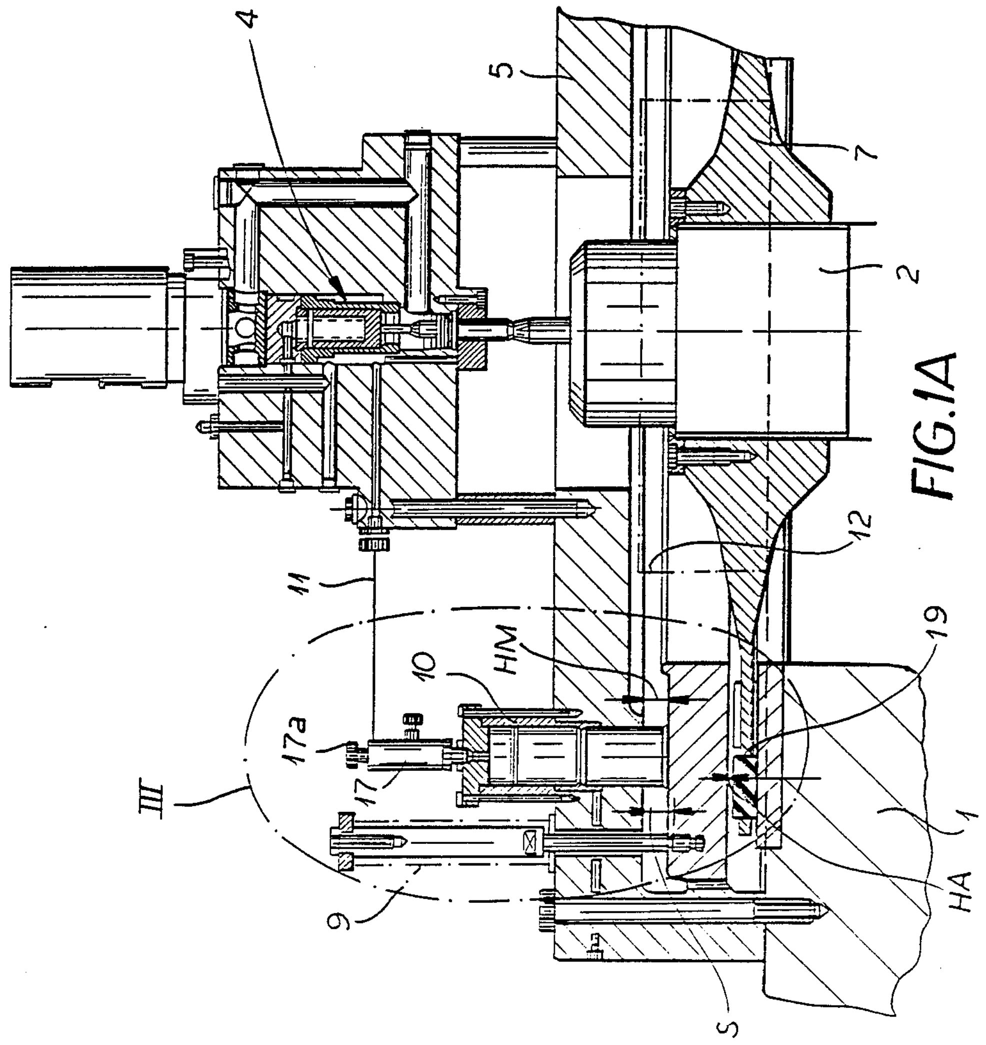
Figure 3:
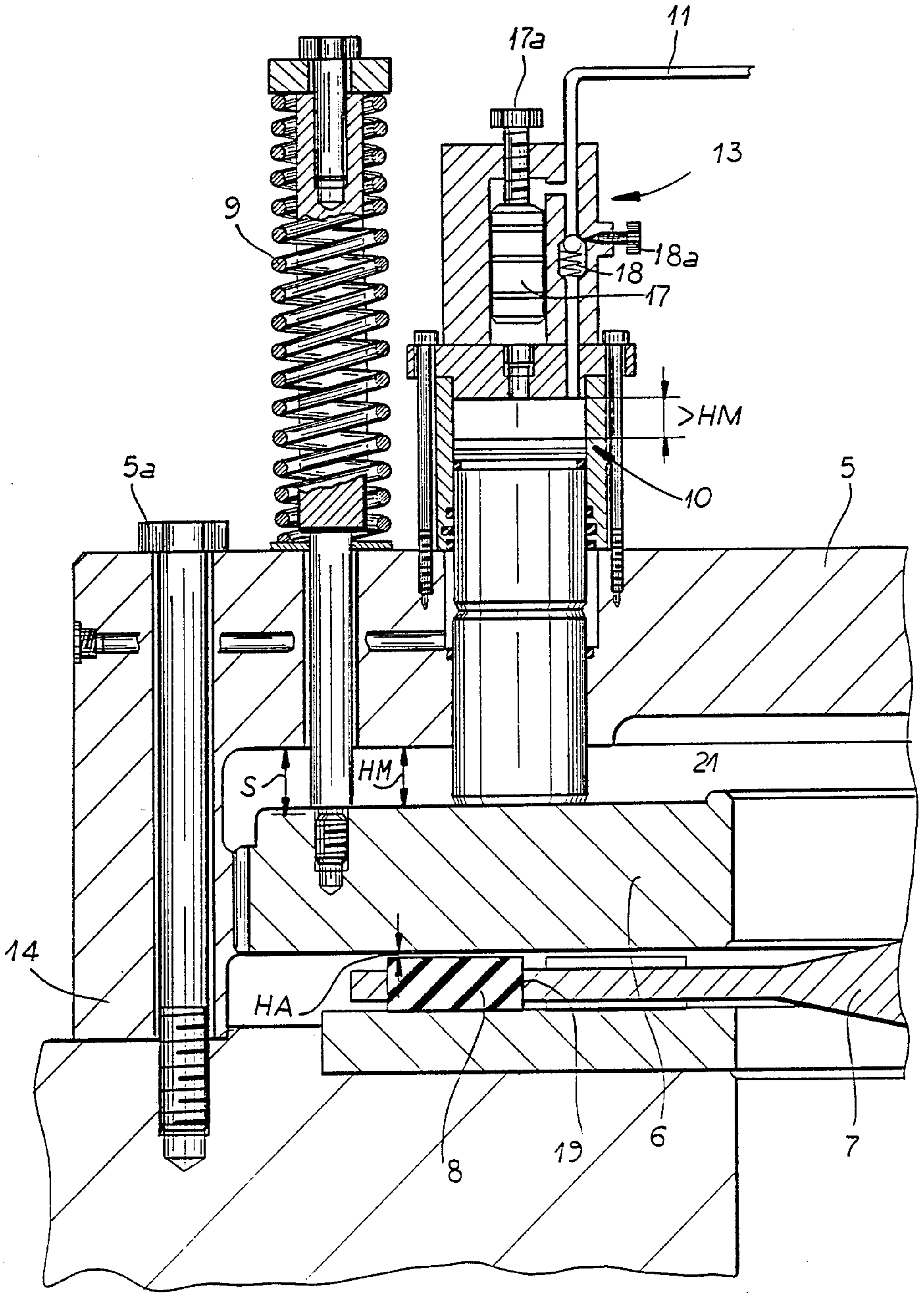
FIG. 3 is an enlarged cross sectional view of the portion indicated at III in FIG. 1; nd

In the preferred embodiment described with respect to FIG. 1A a plurality of hydraulic cylinder piston mechanisms 10 are distributed around the periphery of the coupling cover 5, of which one is shown in FIG. 3.

The coupling cylinder piston mechanisms 10 define a predetermined clutch operating distance S. The clutch operating distance S is indicated by the double-headed arrows in FIG. 3.

It can be seen from FIG. 3 that the clutch operating distance or stroke S of the coupling cylinder piston mechanism 10 is made up of a working distance HA and a mounting distance HM.

The mounting distance HM corresponds in the friction clutch to a mounting free space 21 which is large enough to allow a replacement of coupling elements 8, i.e., has an axial dimension at least equal to the axial thickness of the shoes 8. The mounting free space 21 is associated with at least one service port 12 on the coupling cover 5. By comparison of FIGS. 2 and 3 it can be seen that the controlling and operating mechanism 4 has a clutch operating distance S limiting mechanism 13, by means of which the clutch operating distance is limitable to the working distance HA. This regulating distance limiting mechanism 13 can be taken out of operation, in order to replace worn coupling elements 8. The ratio of the mounting distance to the working distance HA is adjustable in order to compensate for wear on the coupling elements 8. The mounting distance HM, should be at least ten times the working distance HA.

Figure 4:
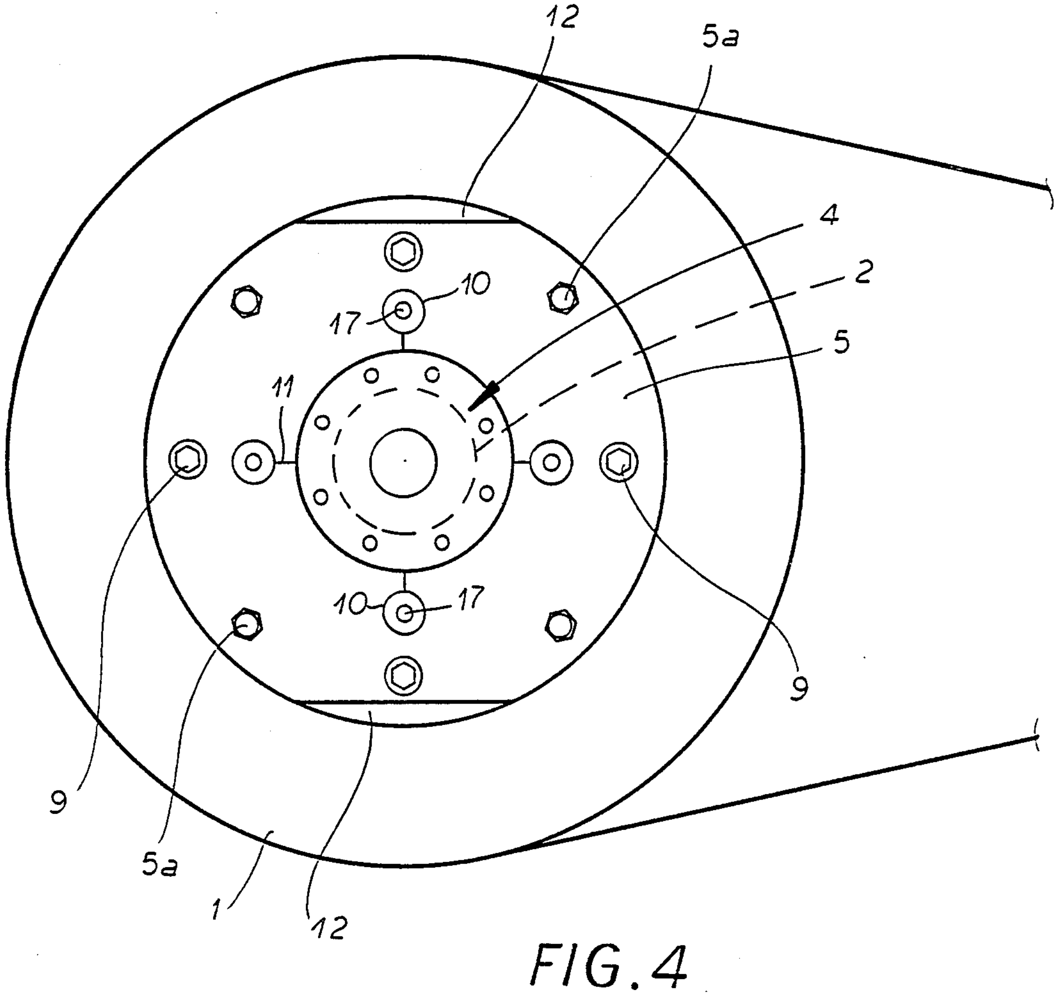
FIG. 4 is a top plan view of the spindle press of FIG. 1A.

The coupling cover 5 may have two closable service ports 12 lying opposite each other 180° apart in its cover shoulders as shown in FIG. 4. One such service port 12 is shown in FIG. 1A by a frame drawn with dotted lines.

Figure 2:
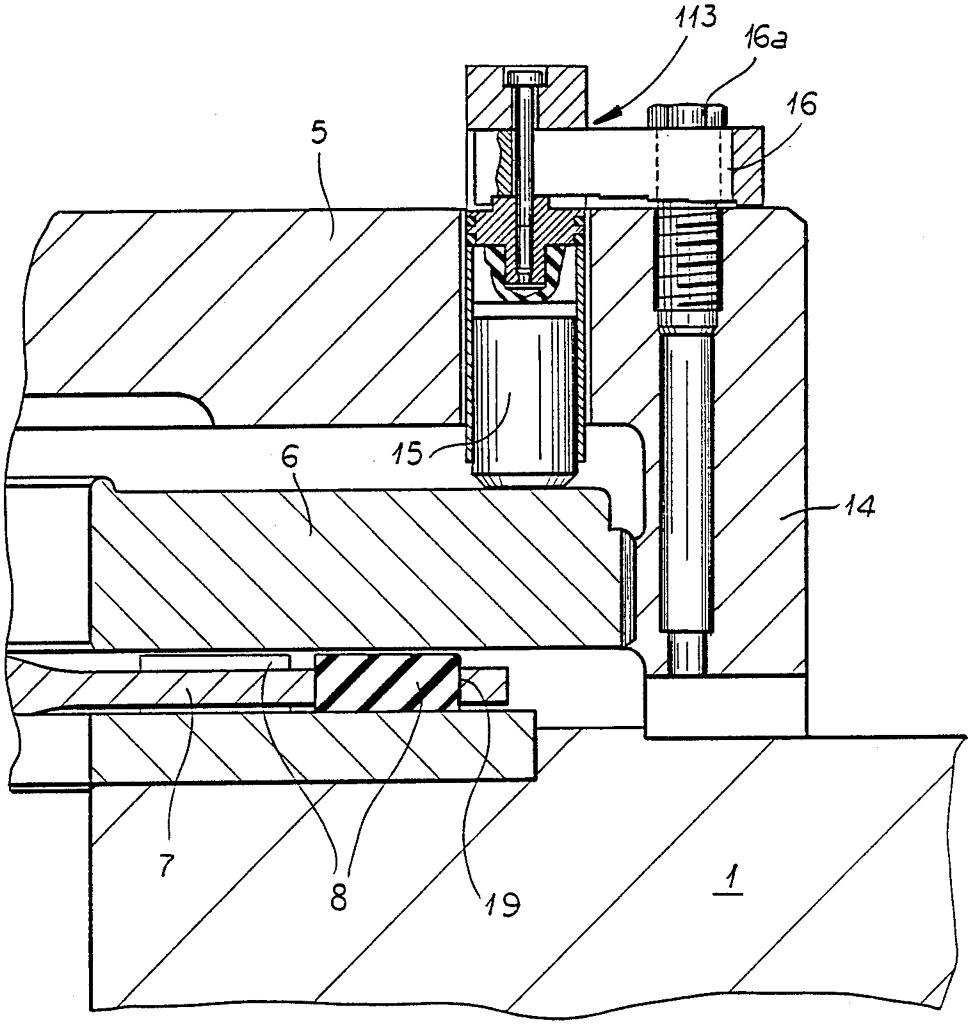
FIG. 2 is an enlarged cross sectional view of a portion indicated by a circle II in FIG. 1B.

In this preferred embodiment the regulating distance limiting mechanism 113 of FIG. 2 is a mechanical device. Particularly from FIG. 2 one sees that it comprises at least one sliding head or plunger 15 mounted slidably and adjustably in the coupling cover 5. It is removable from the coupling cover 5 as well. In this embodiment a plurality of these sliding heads or plungers 15 are distributed around the periphery of the coupling cover 5 and cylinders 10 are used to actuate the clutch but need not have the limiting devices 17 shown thereon. These cylinders can alternate with plungers 15 around the cover 5. Adjustments are made by a stepping wedge 16, which, according to the size decrease of the coupling elements 8 due to wear, can be pushed a different distance into the regulating distance limiting mechanism 113. The bolts 16*a* hold wedges 16 in place and can be released for repositioning of these members.

In FIG. 3 a hydraulic clutch operating distance limiting mechanism 13 is shown which comprises a limiting cylinder piston mechanism 17 with an adjustable limiting distance (controlled by screw 17*a*), and is connected to the coupling cylinder piston mechanism 10.

The pressurizing medium inlet pipe 11 for the coupling cylinder piston mechanism 10 suitably has a non-return or check valve 18 which can be disabled by a screw 18*a*. The non-return valve 18 is mountable parallel to the limiting cylinder piston mechanism 17 in the pressurized medium inlet pipe 11. The friction clutch 3 has a plurality of loose coupling elements or shoes 8.

In FIGS. 1A, 1B, 2 and 3 the coupling elements 8 are mounted replaceably in the coupling element cavities 19 of the opposing second coupling plate 7.

Covers 12*a*, removable by withdrawal of bolts 12*b*, cover the openings 12 (FIG. 1).

We claim:

1. A press comprising:

a frame;

a flywheel rotatable on the frame about an axis;

a spindle rotatable on the frame about the axis;

an axially displaceable ram and nut carried on the frame and threadedly engaging the spindle, whereby rotation of the spindle axially displaces the ram;

a clutch between the flywheel and the spindle and including a clutch housing formed with a radially open service port, a flywheel clutch plate in the housing rotationally fixed to the flywheel, a spindle clutch plate in the housing rotationally fixed to the spindle, one of the plates being formed with axially open cavities and one of the plates being axially movable through a relatively long stroke between an outer position with the plates spaced apart and an inner position with the plates close together, respective high-friction coupling elements releasably received in the cavities and of a predetermined axial height shorter by a working distance than the long plate stroke, means including a coupling mechanism engaged between the movable clutch plate and the housing for displacing the movable plate through the long axial stroke and thereby effectively pressing the clutch plates axially together and rotationally linking the spindle and flywheel; and means including at least one stop operatively engageable with the clutch and displaceable between an operative position for limiting displacement of the movable plate to the working distance and an inoperative position permitting the movable plate to move through the entire axial stroke, the service port being oriented such that in the outer position of the movable plate the coupling elements can be displaced axially out of the respective cavities and removed radially from the clutch housing through the service port.

2. The press defined in claim 1 wherein the stop includes a hydraulic piston-and-cylinder mechanism.

3. The press defined in claim 1 wherein the working distance is at most one tenth the stroke.

4. The press defined in claim 1 wherein the clutch housing is formed with two such service ports diametrally opposed to each other relative to the axis.

5. The press defined in claim 1, further comprising a removable cover normally covering the service port.

6. The press defined in claim 1 wherein the stop is formed by at least one plunger displaceable transversely of the axis on the clutch housing.

7. The press defined in claim 1 wherein the stop includes a hydraulic piston-and-cylinder mechanism connected to the clutch and provided with a check valve through which it is normally connected to a source of fluid under pressure, the valve being provided with a selectable bypass.

* * * * *